(No Model.) 2 Sheets—Sheet 1.
G. A. FARRALL.
MOWER.
No. 472,754. Patented Apr. 12, 1892.
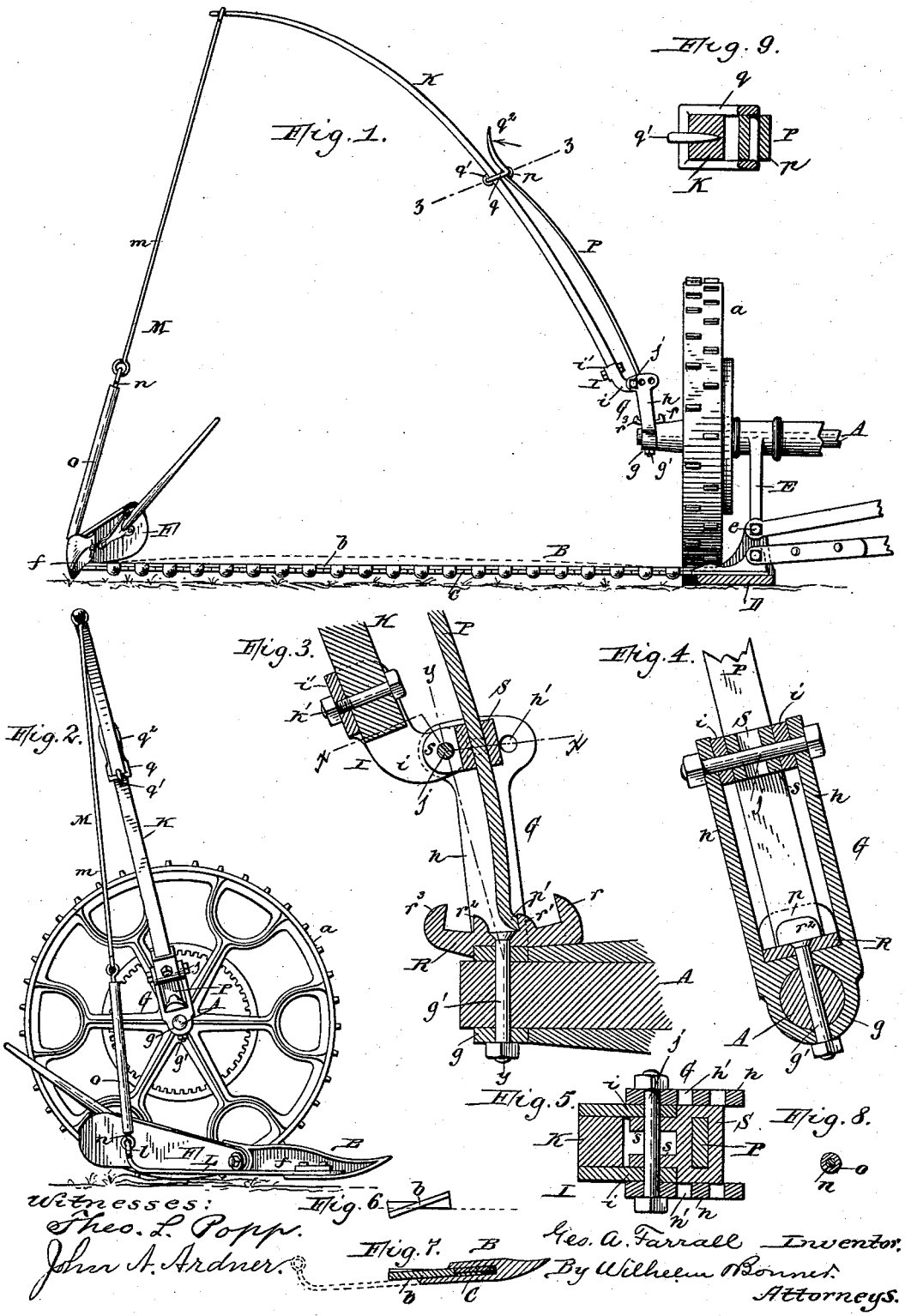
Witnesses:
Theo. L. Popp.
John A. Ardner.
Geo. A. Farrall, Inventor.
By Wilhelm Bonnet
Attorneys.

(No Model.) 2 Sheets—Sheet 2.
G. A. FARRALL.
MOWER.
No. 472,754. Patented Apr. 12, 1892.
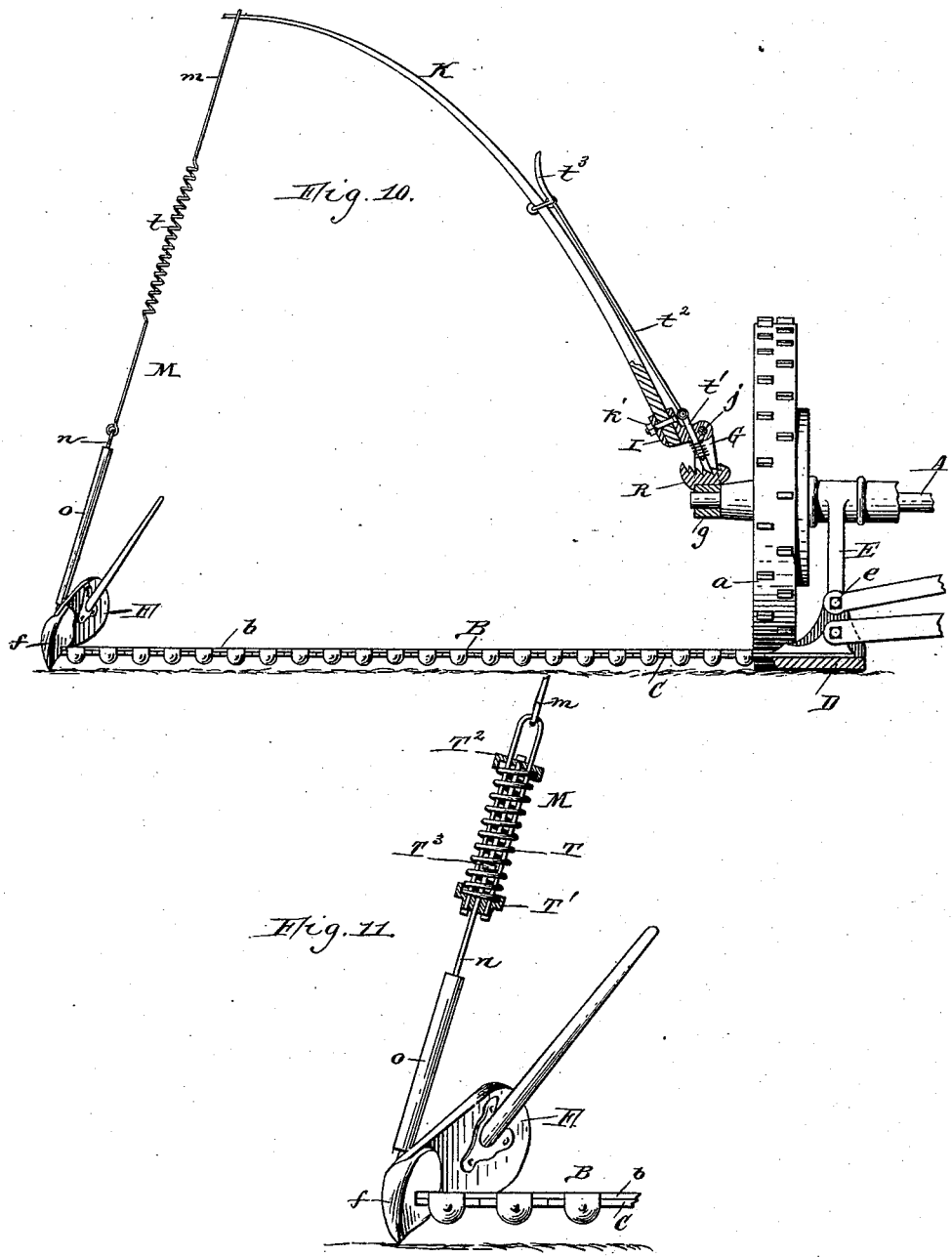
Witnesses:
Theo. L. Popp
Jacob Nusenblatt
Geo. A. Farrall, Inventor.
By Wilhelm Bonner,
Attorneys.

UNITED STATES PATENT OFFICE.

GEORGE A. FARRALL, OF BATAVIA, NEW YORK, ASSIGNOR TO THE JOHNSTON HARVESTER COMPANY, OF SAME PLACE.

MOWER.

SPECIFICATION forming part of Letters Patent No. 472,754, dated April 12, 1892.

Application filed August 9, 1890. Serial No. 361,541. (No model.)

*To all whom it may concern:*

Be it known that I, GEORGE A. FARRALL, a citizen of the United States, residing at Batavia, in the county of Genesee and State of New York, have invented a new and useful Improvement in Mowers, of which the following is a specification.

This invention relates to that class of mowers in which the cutter mechanism is pivoted to the main frame and extends laterally from the side thereof. Heretofore the cutter mechanism in this class of mowers was supported simply by a hinged connection at its inner end. This permits the outer free end to vibrate excessively and interferes with the working of the cutters. The ordinary method of raising the cutter mechanism to avoid stones and other small obstructions or to carry it short distances over mown grass has been to lift and suspend the finger-bar from its inner end. This throws a whipping strain upon the bar, which is a serious objection, especially with long bars. In order to carry a portion of the outer end of the finger-bar, it has been customary to bring a yielding pressure to bear downwardly on the inner end of the bar within a short distance of its pivot or similarly lift a short distance outward from the pivot. This requires considerable pressure, owing to the very short leverage, and causes a heavy strain on the pivot.

The object of my invention is to overcome these difficulties; and it consists in supporting the outer end of the cutter-bar from the main frame or stationary part of the machine, as will be hereinafter more fully described.

In the accompanying drawings, consisting of two sheets, Figure 1 is a fragmentary front elevation of a mower provided with my improvements. Fig. 2 is a side elevation thereof. Fig. 3 is a sectional elevation of the standard and connecting parts for supporting the outer end of the cutter mechanism. Fig. 4 is a sectional elevation in line $y\ y$, Fig. 3. Fig. 5 is a horizontal section in line $x\ x$, Fig. 3. Fig. 6 is an outside end view of the finger-bar, showing the same twisted. Fig. 7 is a transverse section of the cutter-bar, showing the position of the parts when in operation. Fig. 8 is a horizontal section of the grass-roller and its supporting-rod, which divides the grass. Fig. 9 is a section in line $z\ z$, Fig. 1, on an enlarged scale. Fig. 10 is a fragmentary front elevation, partly in section, of a mower provided with a modified construction of my improvements. Fig. 11 is a front elevation, partly in section, of the outer portion of the finger-bar and connecting parts, showing another modification of my improvements.

Like letters of reference refer to like parts in the several figures.

A represents the stationary axle of a mower, and $a$ one of the supporting-wheels journaled at the outer end thereof.

B represents the cutter mechanism, which is composed, essentially, of the finger-bar $b$ and cutter-bar C, all of which parts are constructed and operated in the usual manner. The inner end of the finger-bar is provided with a shoe D, which is pivotally connected to the axle of the mower by means of an arm E, journaled on the axle and secured to the inner shoe by a pivot-bolt $e$, which permits the finger-bar to swing upwardly. The outer end of the finger-bar is provided with a shoe $f$, carrying on its rear side a tracker-board F, all of which parts may be of any well-known and suitable construction.

G represents a bifurcated standard secured to the outer end of the stationary axle A and supporting the adjustable devices which support the outer end of the cutter-bar. This standard is composed, preferably, of a collar $g$ and two upwardly-extending arms $h\ h$, formed on said collar. The collar $g$ surrounds the outer end of the axle, and the standard is secured to the latter by means of a bolt $g'$, which passes through the collar and the outer end of the axle. The upper ends of the arms $h\ h$ are somewhat enlarged and provided each with a series of openings $h'\ h'$.

I represents a clip composed of two depending ears $i\ i$, connected at their upper ends by a cross-bar $i'$. The ears of the clip are pivotally secured between the upper ends of the standard-arms $h\ h$ by a transverse screw-bolt $j$, passing through perforations in the clip-ears $i\ i$ and one pair of the openings in the standard-arms.

K represents a yielding rod or pole, which supports the outer end of the cutter-bar, and is preferably made of wood or similar elastic material. This pole is secured with its lower square end in the clip I by means of a bolt $k'$, and extends obliquely upwardly and outwardly. This pole is preferably tapered slightly toward its upper end, so as to provide a certain amount of elasticity.

L represents a rearwardly-extending bar secured to the outer shoe and provided at its rear end with an upturned eye $l$. The latter is connected to the upper end of the flexible supporting-pole K by means of a jointed connecting-rod M, composed of upper and lower sections $m$ $n$, respectively. The latter are provided with eyes, whereby they are attached to each other and the supporting-pole and the eye-bar on the outer shoe. By thus supporting the cutter-bar at its outer end it is held against undue vibration, which enables the cutter-knives to operate more effectively and wear less. The lower section $n$ of the connecting-rod is provided with a roller $o$, which surrounds said rod. This roller revolves when it brushes against the cut grass and prevents the latter from winding around the rod and accumulating thereon.

The supporting-pole K is sufficiently elastic to provide a yielding support for the outer end of the cutter-bar; but in order to enable the tension to be varied a spring P is provided, which is arranged on the inner side of said pole. The spring consists of a flat steel plate provided with an eye $p$ at its upper end and a nose $p'$ at its lower end. The upper end of the spring is pivotally secured to the inner side of the supporting-pole by means of a loop $q$, which latter is pivoted with one end on the under side of the pole by a staple $q'$ and passing with its opposite end through the eye of the spring. A handle $q^2$ is preferably formed on the loop $q$, so as to permit the latter to be easily swung on its pivot in adjusting the spring. The lower end of the spring bears inwardly against one of a series of upwardly-projecting teeth or serrations $r$ $r'$ $r^2$, formed on the plate R. The latter is arranged between the upright arms of the standard and secured on the collar $g$, preferably by the same bolt $g'$ which secures the standard on the outer end of the axle.

S represents a pivoted socket, which embraces the intermediate portion of the spring. This socket is provided with two outwardly-projecting lugs $s$ $s$, and is pivotally secured between the upper ends of the standard-arms by the bolt $j$, which passes through perforations in the lugs of the socket.

By employing a single bolt for securing the pole-clip and spring-socket in the standard it forms a simple means of pivoting these parts concentrically in the standard.

In the normal position of the parts the lower end of the spring will bear inwardly against one of the series of teeth on the plate R, while its upper end supports the cutter-bar through the medium of the pole and the connecting-rods.

When it is desired to increase the tension of the pole and spring on the outer end of the cutter-bar, the transverse bolt $j$ is removed and the pole-clip and spring-socket are moved inwardly in the standard and secured by inserting the bolt in a pair of the standard-openings located farther inwardly.

When it is desired to raise the cutter-bar to avoid stones and other small obstructions, the lower end of the spring is raised out of engagement with the toothed plate by pressing upwardly on the handle of the loop and the pole is swung inwardly on its pivot. When it is desired to support the pole in this position, the spring is again lowered and engaged in one of the outer spaces of the toothed plate. The lugs $r$ and $r^3$ on opposite ends of the plate R are higher than the intermediate lugs, so as to limit the movement of the lower end of the springs which support the pole.

In order to fold or raise the cutter-bar into an upright position for transportation when not in use, the connecting-rod M is jointed in such a place as will permit it to fold without twisting the rod. The weight of the cutter-bar may cause it to sag or bend slightly at the middle, as it is supported only at its ends, which would interfere somewhat with the free operation of the knives. In order to guard against this, the finger-bar may be bent upward at its center sufficiently to compensate for the sag which may occur, thus causing the cutter-bar to assume a straight position when supported at its ends, as indicated in Fig. 1.

It is desirable to place the rod connecting the pole with the outer shoe as far back as possible in order to avoid interference with the cutting of the grass; but this has a tendency to tilt the outer end of the cutter-bar downwardly at its front side by lifting its rear side, and this would impair the operation of the cutters. To guard against this the outer portion of the finger-bar may be twisted upwardly at its front side to compensate for any twist in an opposite direction which may occur in the outer portion of the cutter-bar, as represented in Fig. 6.

It is obvious that the supporting-pole may be attached to some other stationary part of the machine instead of the axle, and this is particularly necessary when the axle rotates.

The flat spring in the pole may be omitted and the requisite elasticity be provided by a coil-spring $t$, formed in the rod M, as represented in Fig. 10. In the construction represented in this figure the pole is held in position by a spring-bolt $t'$, which is operated by a rod $t^2$ and a hand-lever $t^3$.

If desired, the spring may be applied to the rod M, as represented in Fig. 11, in which construction the spring T rests upon a washer T', which is attached to the upper part of the connecting-rod, and the weight is applied to the spring by a washer $T^2$, which rests on the spring and is attached to the lower part of the connecting-rod. A stop $T^3$ may be provided on one of the parts of the rod which limits the compressing movement of the washers and renders the connection rigid when the spring has been compressed to a certain extent. This prevents overloading of the spring and at the same time provides sufficient elasticity to carry a portion of the weight of the cutter-bar before the rigid stop comes into operation. The elastic support furnished by the elastic pole itself or by the spring connected with it carries a portion of the weight of the finger-bar and permits the latter to rest on the ground with little friction and to pass lightly over inequalities of the surface and obstructions, while permitting the finger-bar to descend quickly to its normal position upon clearing an obstruction.

I claim as my invention—

1. The combination, with the mower-frame and the finger-bar pivotally connected to one side of said frame, of a laterally-projecting elastic support attached with its inner end to said frame and having its outer end connected with the outer end of the finger-bar, substantially as set forth.

2. The combination, with the mower-frame and the laterally-projecting finger-bar pivotally connected to one side of said frame, of a pole attached with its inner end to said frame, a spring whereby said pole is yieldingly supported, and a rod connecting the free end of the pole with the outer end of the finger-bar, substantially as set forth.

3. The combination, with the mower-frame and the laterally-projecting finger-bar pivotally secured to one side thereof, of a standard secured to the frame, a pole pivoted with its lower end in said standard, a spring supporting said pole with its upper end and seated with its lower end in said standard, and a rod connecting the upper end of said pole with the outer end of said finger-bar, substantially as set forth.

4. The combination, with the mower-frame and the laterally-projecting finger-bar pivotally connected to one side thereof, of a standard secured in said frame, a laterally-projecting pole pivotally secured with its inner end to said standard, a spring attached with its upper end to said pole and adjustably arranged with its lower end in said standard, and a rod connecting the outer end of said pole with the outer end of said finger-bar, substantially as set forth.

5. The combination, with the mower-frame and a laterally-projecting finger-bar pivoted to one side thereof, of a laterally-projecting support pivoted to the frame and connected with the outer end of the finger-bar, and an adjustable fastening, whereby the pivoted support can be secured at a greater or less elevation, substantially as set forth.

6. The combination, with the mower-frame and the laterally-projecting finger-bar pivotally secured to one side thereof, of a bifurcated standard secured to said frame and having a series of openings at its upper end, a serrated plate secured in the bifurcated standard, clip pivotally secured in said standard by a bolt passing through said openings, a pole secured with its lower end to said clip, a spring connected with its upper end to the pole by means of a pivoted hand-lever and engaging with its opposite end against the serrated plate, a loop or socket embracing the intermediate portion of said spring and pivoted concentric with said clip, and a rod connecting the outer end of said pole with the outer end of said finger-bar, substantially as set forth.

7. The combination, with the mower-frame and the laterally-projecting finger-bar pivotally secured to one side thereof, of a laterally-extending pole secured to the frame with its inner end, a rod connecting the outer end of said pole with the outer end of said finger-bar, and a roller surrounding said rod, substantially as set forth.

8. The combination, with the mower-frame, of a flexible finger-bar having an upward curvature from both ends toward the middle, and a yielding support connecting the outer end of the finger-bar with the mower-frame, whereby the weight of the finger-bar causes it to become straight when in position for use, substantially as set forth.

9. A finger-bar having a longitudinal twist, with the front side raised above the rear side at the outer end of the bar, substantially as set forth.

10. The combination, with the mower-frame, of a finger-bar pivoted with its inner end to one side of said frame and having a longitudinal twist, with the front side raised above the rear side at the outer end of the bar, and a support attached with its inner end to the frame and with its outer end to the rear of said bar, substantially as set forth.

Witness my hand this 5th day of August, 1890.

GEORGE A. FARRALL.

Witnesses:
ALBERT J. GLASS,
E. J. MOCKFORD.